2,642,156

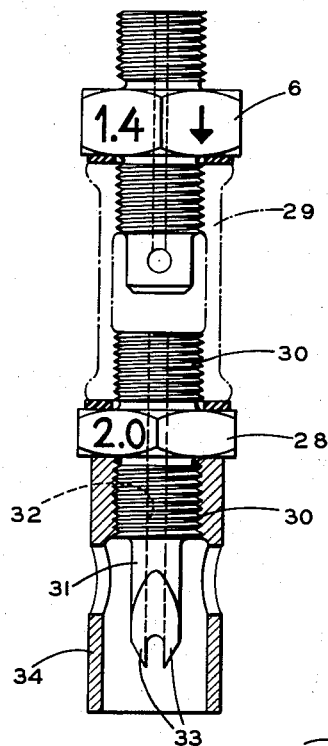
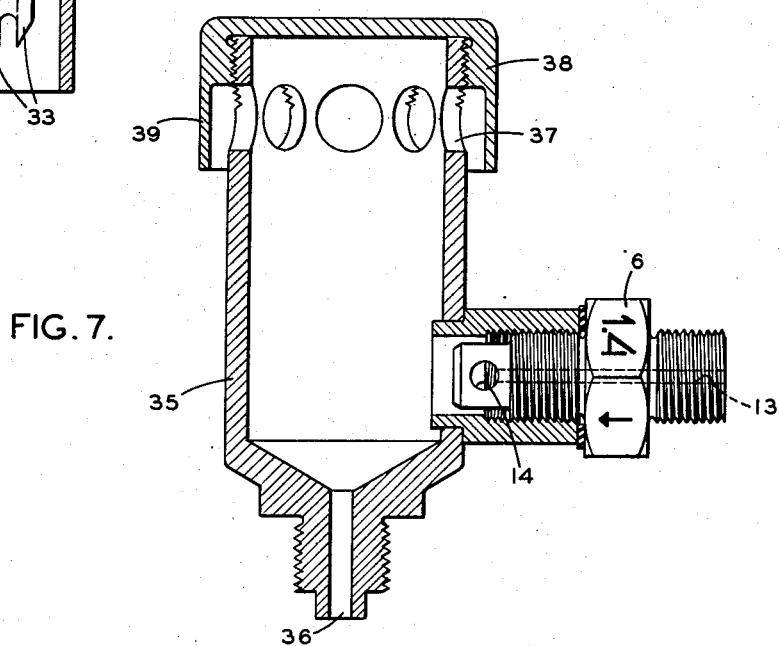
FIG. 6.
FIG. 7.
INVENTORS
KARL EVALD ANDREAS GOTHBERG
SIGURD SANDAHL
BY THEIR ATTORNEYS
Howson & Howson Patented June 16, 1953

UNITED STATES PATENT OFFICE 2,642,156

LUBRICATING SYSTEM

Karl Evald Andreas Gothberg, Goteborg, and Sigurd Sandahl, Heden, Sweden, assignors to Aktiebolaget Svenska Kullagerfabriken, Goteborg, Sweden, a corporation of Sweden Application March 6, 1947, Serial No. 732,901
In Sweden March 28, 1946

17 Claims. (Cl. 184—7)

It has been proposed to lubricate bearings with oil mist generated in an oil mist lubricator, which supplies oil mist to one or more bearings. This system has several advantages as compared to other lubricating systems, for instance lubrication with drip oilers or the like. One advantage is that the oil consumption can be greatly reduced, since the rate at which oil is supplied to the bearings can be considerably diminished without the risk of interruption of the supply of oil to any of the bearings. Although the saving is considerable as compared with other lubricating methods much oil is still lost, since of the oil supplied to a bearing as oil mist, usually less than 0.5 cm.$^3$ per hour, quite a large proportion escapes through the bearing seals to the atmosphere. The purpose of the present invention is to further reduce the oil consumption in lubricating systems with oil mist lubricators and is characterized mainly by one or more local constrictions in the ducts between the place at which the mist is formed and the member or members to be lubricated. The oil mist is precipitated at the constrictions and changed to a mixture of fluid oil and air, whereby practically the whole of the oil in the mist is utilized for lubricating purposes, which is not the case as long as the oil is in the form of small particles suspended in the air. The original transformation of the oil into oil mist then only serves the purpose of making it possible to transport very small quantities of lubricant to the various members to be lubricated and to distribute the lubricant as desired.

Figure 1:
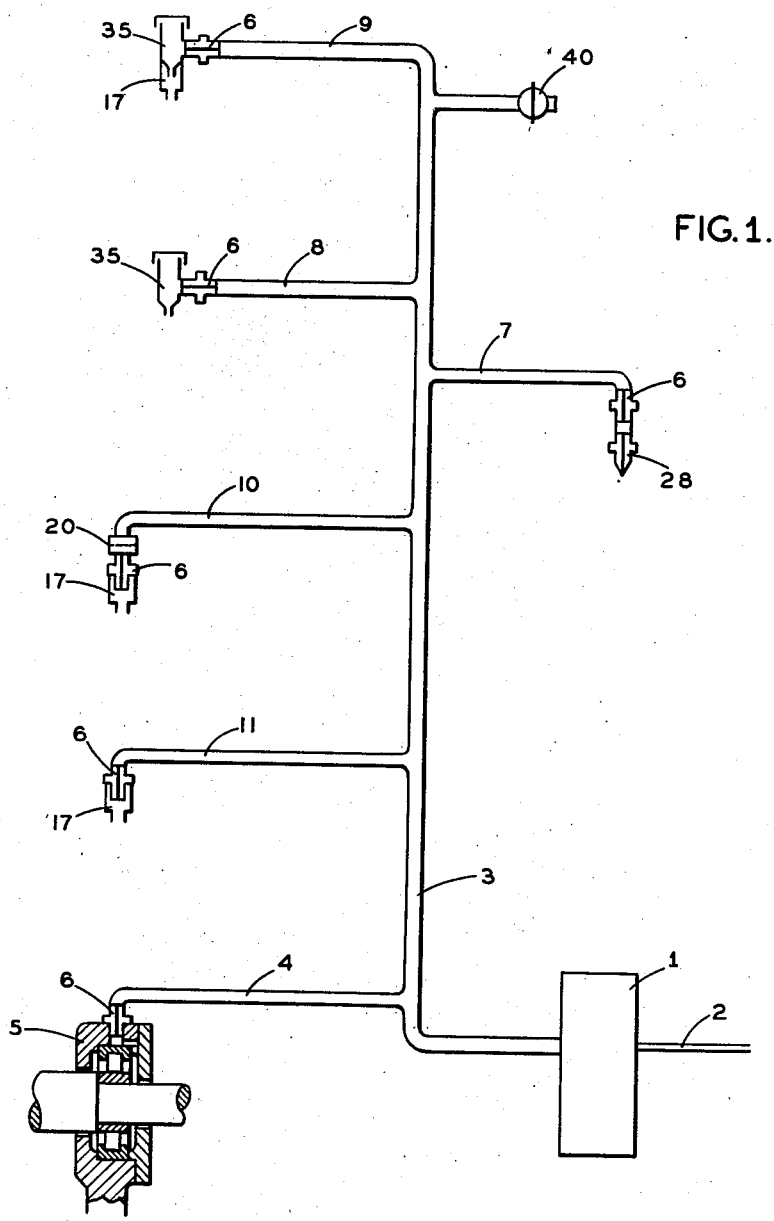
Figure 2:
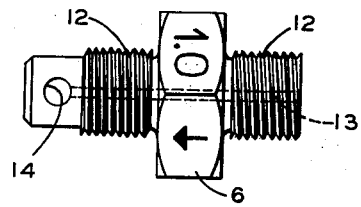
Figure 3:
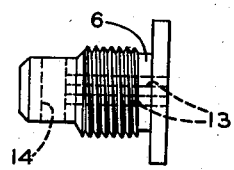
Figure 4:
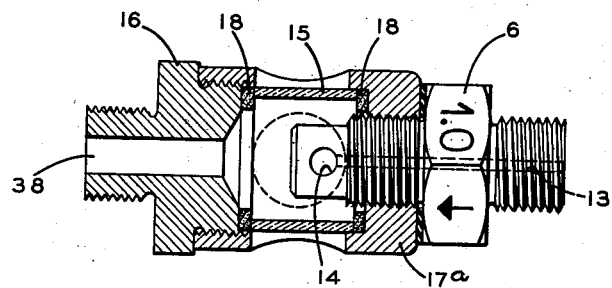

The invention is illustrated in the accompanying drawings, in which Fig. 1 shows diagrammatically a lubricating system. Figs. 2 and 3 show two different forms of precipitating nipples. Fig. 4 shows a precipitating nipple, combined with a sight glass and Fig. 5 a nipple, combined with a filter. Fig. 6 shows a precipitating nipple, combined with a spray nozzle and Fig. 7 shows a nipple, combined with a drip oiler.

In the lubricating system shown in Fig. 1 the numeral 1 indicates generally an oil mist lubricator of known design, to which air under pressure is supplied from a suitable source through an air line 2. The oil mist generated in the lubricator passes into a main duct 3, which is common to a number of ducts branching off therefrom and each leading to a machine part to be lubricated. Thus the duct 4 leads to a bearing housing 5, in which is a bearing to be lubricated. Before reaching the housing 5 the oil mist from the duct 4 passes through a precipitating nipple 6. A precipitating nipple 6 and a spray nozzle 28 are connected to the duct 7. The duct 8 leads to a precipitating nipple 6 and a drip oiler 35. The duct 9 is provided not only with a precipitating nipple and drip oiler as is the duct 8 but also with a sight glass assembly 17. A filter 20 is connected in front of the precipitating nipple 6 in the duct 10. The nipple 6 in the duct 11 is provided with a sight glass assembly 17. The internal diameter of the branch ducts leading to the precipitating nipples may be about 6 mm., or somewhat greater if a larger quantity of lubricant is required. The internal diameter of the main duct should be 12 mm. or more.

The precipitating nipple 6 is illustrated in Fig. 2. It is provided with two threaded portions 12 for connection to the lubricating system. The nipple has an axially extending bore 13, which is very constricted relative to the inside diameter of the remainder of the system. The diameter of the bore of the nipple chosen may vary, according to the quantity of lubricant to be provided, from about 0.7 mm. to about 2.8 mm., but will usually be of the magnitude of about 1 mm. The channel 13 opens into a wider cross channel 14. An arrow on the nipple indicates the direction of flow, in which the precipitating effect of the nipple is greatest. It has been found that when the oil mist flows through the nipple in the direction indicated by the arrow as much as 98% of the particles of oil in the mist can be precipitated to form fluid oil. In this manner it is possible to utilize practically the whole of the oil in the oil mist for lubricating purposes.

The precipitating nipple is preferably connected in the branch duct leading from the main duct to the bearing to be lubricated. By means of the nipples it is possible to distribute the lubricant among the various branch ducts in proportions as required by the various bearings. This is done by using for each bearing a nipple having a bore of suitable diameter. If it is found that a bearing requires more, or possibly less, lubricant the nipples can easily be exchanged.

Fig. 3 shows a form of the nipple, which does not differ in principle from the nipple according to Fig. 2, but which is very suitable for use when the oil mist is led through channels in a bearing housing instead of through tubes. This nipple is provided with two axially extending channels 13, both of which open into the cross channel 14.

Fig. 4 shows a precipitating nipple 6, combined with a sight glass 15, mounted in a housing comprising two parts 16 and 17a screwed together. The cylindrical glass 15 is sealed by packings 18. The direction of flow is from the nipple and the oil and air leave through an opening 38. If the speed of the flow is sufficiently great it is possible to see through the glass how the oil precipitated in the nipple follows the stream of air and thus check that no stoppage has taken place.

Figure 5:
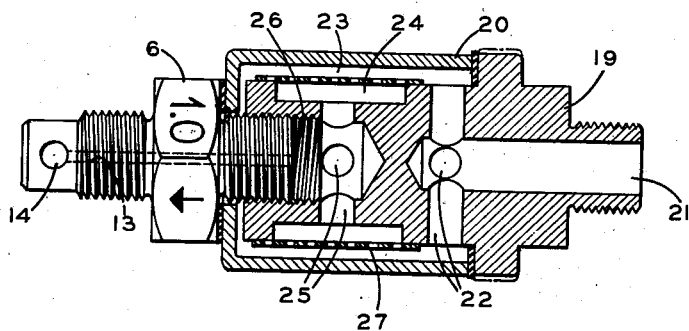

In the device according to Fig. 5 the nipple 6 is screwed into a body 19 of a filter and holds a casing 20 on the body. The body 19 is provided with an axially extending channel 21, which opens into a pair of cross channels 22. These lead to an annular chamber 23 between the casing 20 and the body 19. A peripheral groove 24 is provided in the body from which a pair of cross channels 25 lead to the axially extending channel 13 in the nipple 6 through an axial bore 26 in the body 19. A filter 27 surrounds the groove 24 and separates it from the chamber 23. The oil mist flows through the channel 21 and the cross channels 22 to the chamber 23. After passing through the filter 27, where it is filtered, and into the groove 24 it proceeds further through the cross channel 25 and the bore 26 to the channels 13 and 14 in the nipple where precipitation takes place. In this manner any loose particles or solid bodies are prevented from reaching the relatively constricted passage 13, where they might become lodged. As a rule the ducts will be free from such particles and the filter need only be used in especially important cases.

Fig. 6 shows a precipitating nipple 6 connected to a spray nozzle 28 by means of a sleeve 29. The nozzle has a pair of threaded portions 30 and a cylindrical extension 31. It has an axial bore 32. One end of the extension 31 is wedge-shaped so that a pair of sharp points 33 are formed. A protecting sleeve 34 for the points is screwed onto one of the threads 30. The cross sectional area of the bore of the nozzle should be 50 to 100% greater than that of the precipitating nipple. The oil precipitated in the nipple gathers on the points 33 and is carried along by the flow of air in the form of small drops, which are spread onto the surface to be lubricated. The nozzle is suitable for lubricating free surfaces such as plates, tools for presses, gear teeth, driving chains etc. In certain cases, for instance for lubricating bearings in bearing housings, the nozzle can be mounted directly in a threaded hole in the wall of the housing so that it points toward the rolling bodies of the bearing.

For lubricating sliding surfaces it is preferable to have an apparatus which can deliver drops of oil separate from the flow of air. An apparatus of this kind is shown in Fig. 7 and consists of a precipitating nipple connected to a drip oiler. The drip oiler has a chamber 35, provided at its lower end with an oil outlet 36. At the top of the chamber are a number of air escape holes 37. A cover 38 is screwed onto the chamber and has a downwardly directed flange 39 for protecting the holes. While passing through the precipitating nipple 6 the oil particles suspended in the oil mist are united to form fluid oil, which emerges from the chamber 35 through the outlet 36 in the form of drops of oil. The air escapes through the outlets 37. The apparatus thus functions as an oil dripper and the quantity of oil can be regulated by using a precipitating nipple having a suitable area of flow. When a machine is being started for the first time it may be advisable to unscrew the cover 38 and drop a few drops of clean oil into the chamber 35.

The oil dripper according to Fig. 7 can be combined with the sight glass according to Fig. 4, whereby it is possible to check the flow of the oil through the glass.

In order to check if lubricant is reaching all parts to be lubricated, especially in cases where there is no sight glass, a valve (40 in Fig. 1) can be connected at any suitable point in the main duct, whereby the duct can be put in communication with the atmosphere. It is thus possible to lower the pressure in the main duct while maintaining or even increasing the production of oil mist. The rate of flow through the precipitating nipples can in this way be reduced to such a low value that none, or only a very small part, of the oil mist flowing through the nipples is precipitated in the form of fluid oil. The oil mist reaching the various places of lubrication leaks out through the seals or through the outlets from the branch lines and is visible in the form of a white mist.

Other combinations of the elements above described are of course possible without departing from the spirit of the invention. The nipples can be provided with any desired number of axial channels. It is also possible to use filters or the like which form a greater number of constricted passages than the nipples above described.

Having thus described our invention, we claim and desire to secure by Letters Patent:

1. A lubricating system for supplying oil in a liquid state to a surface to be lubricated, comprising a mist generator for entraining particles of liquid oil in a gas to form an oil mist having a pressure substantially greater than atmospheric pressure, and a duct of relatively great cross-section leading from the generator to the surface to be lubricated; there being in the duct, between the generator and said surface a mist precipitator, including a local constriction of much smaller cross-section, and means providing a surface transverse to the direction of flow through the local constriction and adjacent the outlet end thereof to precipitate a substantial portion of the entrained oil from the oil mist passing therethrough and to discharge the precipitated oil to the surface to be lubricated and to discharge the gas to the atmosphere.

2. A lubricating system according to claim 1 having a main duct leading from the mist generator and a plurality of secondary ducts each leading from the main duct to surfaces to be lubricated, a precipitator being located in each of the secondary ducts.

3. A lubricating system according to claim 1 wherein the precipitator is located near the surface to be lubricated.

4. A lubricating system according to claim 1 wherein the constriction takes the form of a channel the cross-sectional area of which is small relative to the cross-sectional area of the rest of the duct and which discharges into a cross channel having greater cross-sectional area than said channel.

5. A lubricating system according to claim 4 wherein the constricted channel and cross channel are formed in a nipple connected to the duct.

6. A lubricating system according to claim 1 wherein a nozzle is connected in the duct after the precipitator, the mouth of said nozzle being provided with at least one projection extending substantially in the direction of lubricant flow.

7. A lubricating system according to claim 1 wherein the precipitator opens into a vessel having an oil outlet located at its lower end and having at least one air outlet at its upper end.

8. A lubricating system according to claim 1 wherein a valve is connected to the duct for sufficiently venting the interior of the duct to the atmosphere to reduce the pressure in the duct enough to inhibit precipitation by the precipitator.

9. A lubricating system for delivering oil in a liquid state to a part to be lubricated, comprising a generator for entraining small particles of liquid oil in a gas to form an oil mist and for supplying the mist at a pressure substantially greater than atmospheric pressure, a conduit leading from the generator for conveying the oil mist, a precipitator connected with the conduit for separating a substantial portion of the oil from the gas and for supplying the separated oil and the gas to the part to be lubricated, said precipitator having a passageway of substantially less cross sectional area than the conduit and a transverse wall close to the outlet end of the passageway against which the stream of oil mist impinges to cause the oil mist particles to coalesce, and duct means for conveying oil from the wall to the part to be lubricated.

10. A lubricating system for delivering oil in a liquid state to a part to be lubricated, comprising a generator for entraining small particles of liquid oil in a gas to form an oil mist and for supplying the mist at a pressure substantially greater than atmospheric pressure, a conduit leading from the generator for conveying the oil mist, and a precipitator connected with the conduit for separating a substantial portion of the oil from the gas and for supplying the separated oil and the gas to the part to be lubricated, the precipitator having a passage of much smaller cross sectional area than the conduit and a baffle surface adjacent the outlet end of the passage, said precipitator receiving oil mist and discharging oil to the part to be lubricated, the oil mist pressure developed by the generator being great enough to produce a flow through the passage at a sufficient velocity to precipitate a substantial portion of the oil against said baffle surface, and the conduit being sufficiently larger than the passage to inhibit substantial precipitation of oil in the conduit.

11. A lubricating system for delivering oil in a liquid state to a part to be lubricated, comprising a generator for entraining small particles of liquid oil in a gas to form an oil mist and for supplying the mist at a pressure substantially greater than atmospheric pressure, a conduit leading from the generator for conveying the oil mist, a precipitator connected with the conduit for separating a substantial portion of the oil from the gas and for supplying the separated oil and the gas to the part to be lubricated, the precipitator having a wall and a passage of substantially lesser cross sectional area than the conduit, said precipitator receiving oil mist and discharging it against the wall, and means for conveying precipitated oil to the part to be lubricated, the oil mist pressure developed by the generator being great enough to produce a flow through the passage at a sufficient velocity to precipitate a substantial portion of the oil, and the conduit being sufficiently larger than the passage to inhibit substantial precipitation of oil in the conduit, and control means connected to the conduit and operable substantially to reduce the pressure in the conduit to reduce the effectiveness of the precipitator so that oil mist visibly escapes from the part to be lubricated.

12. The combination of claim 11, wherein the control means comprises a valve for venting the conduit to the atmosphere.

13. A lubricating system for delivering oil in a liquid state to a part to be lubricated, comprising a generator for entraining small particles of liquid oil in a gas to form an oil mist and for supplying the mist at a pressure substantially greater than atmospheric pressure, a conduit leading from the generator for conveying the oil mist, and a precipitator connected with the conduit for separating a substantial portion of the oil from the gas and for supplying the separated oil and the gas to the part to be lubricated, the precipitator including a passage connected with the duct and means forming a baffle transversely positioned adjacent the outlet of the passage to divert oil mist discharging from the passage, the oil mist pressure developed by the generator being great enough to produce a flow through the passage and against the baffle at a sufficient velocity to precipitate a substantial portion of the oil, and the conduit being sufficiently larger than the passage to inhibit substantial precipitation of oil in the conduit.

14. In an oil mist lubricating system in which oil is conveyed as a suspension in air through a conduit system in which the conduits are of relatively large cross-sectional area, an oil precipitator connected to the conduit system and located adjacent a part to be supplied with lubricant, said precipitator comprising a fitting having a passageway and a wall transverse to the passageway close to the outlet end thereof, the passageway being of such small cross-sectional area that the velocity of flow will be greatly increased with respect to the velocity of flow of air and oil through the conduits, substantially all of the oil carried to the fitting in the suspension phase by impinging against said wall is changed to the liquid phase.

15. In a lubricating system in which oil is conveyed to points adjacent the parts to be lubricated in suspension in air under a pressure substantially greater than atmospheric pressure through a branched system composed of relatively large conduits at relatively low velocity, precipitating means connected to the conduit system individual to each of the parts to be lubricated and adjacent thereto for separating the oil from the air and delivering the separated oil and the air to the individual part, said means having a relatively small passageway for receiving the oil suspension and a baffle positioned adjacent the outlet of the passageway to divert the oil suspension impinging at high velocity upon the baffle.

16. The combination of claim 15, wherein the baffle is formed by a transverse duct connected with the outlet of the passageway, the transverse duct having a substantially greater cross-sectional area than the passageway.

17. In a lubricating system in which oil is conveyed as a suspension in air through a conduit system, the combination of a precipitator connected with the conduit system and located adjacent a part to be supplied with oil for separating a substantial portion of the oil from the air, and a vessel for accumulating the separated oil connected with the precipitator and provided with an oil outlet located at its lower end and an air outlet at its upper end.

KARL EVALD ANDREAS GOTHBERG.
SIGURD SANDAHL.

References Cited in the file of this patent

UNITED STATES PATENTS

| Number | Name | Date |
|---|---|---|
| 1,771,536 | Greene | July 29, 1930 |
| 1,893,995 | Jung | Jan. 10, 1933 |
| 2,031,368 | Hodson | Feb. 18, 1936 |
| 2,253,327 | Delaval-Crow | Aug. 19, 1941 |
| 2,334,942 | Malone | Nov. 23, 1942 |